(12) United States Patent
Sakurai et al.

(10) Patent No.: US 6,893,583 B2
(45) Date of Patent: May 17, 2005

(54) FLAME-RETARDANT CURABLE RESIN COMPOSITION AND FLAME-RETARDANT CURABLE ADHESIVE COMPOSITION

(75) Inventors: Tetsuya Sakurai, Shibukawa (JP); Hidehiro Mihara, Shibukawa (JP); Kohichi Taguchi, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 178 days.

(21) Appl. No.: 10/091,422

(22) Filed: Mar. 7, 2002

(65) Prior Publication Data

US 2002/0193487 A1 Dec. 19, 2002

(30) Foreign Application Priority Data

Mar. 8, 2001 (JP) ........................................ 2001-064511

(51) Int. Cl.$^7$ ................................................. C08K 3/32
(52) U.S. Cl. .................. 252/182.13; 252/609; 524/415; 524/416; 524/500; 524/849
(58) Field of Search ............................ 252/182.13, 609; 524/415, 416, 500, 849

(56) References Cited

U.S. PATENT DOCUMENTS 5,330,844 A    7/1994  Taguchi et al.
5,851,663 A *  12/1998 Parsons et al. ............. 428/355
5,863,989 A    1/1999  Taguchi et al.

FOREIGN PATENT DOCUMENTS

| CN | 1167801 | 12/1997 |
|----|---------|---------|
| CN | 1215409 | 4/1999  |
| JP | 08-198907 | 8/1996 |
| JP | 08-283535 | 10/1996 |
| JP | 2001-247836 | 9/2001 |
| JP | 2001-261723 | 9/2001 |
| JP | 2001-261724 | 9/2001 |
| JP | 2001-262107 | 9/2001 |
| JP | 2001-271037 | 10/2001 |

OTHER PUBLICATIONS

Patent Abstracts of Japan, JP 2000–230126, Aug. 22, 2000.

* cited by examiner

*Primary Examiner*—Kriellion A. Sanders
(74) *Attorney, Agent, or Firm*—Oblon, Spivak, McClelland, Maier & Neustadt, P.C.

(57) ABSTRACT

A flame-retardant curable resin composition which comprises (1) a polymerizable vinyl monomer having a glass transition temperature of its homopolymer of at most 0° C., (2) a polymerization initiator, (3) a reducing agent and (4) a flame retardant in an amount of from 25 to 75 parts by mass based on 100 parts by mass of the total of (1) the polymerizable vinyl monomer having a glass transition temperature of its homopolymer of at most 0° C., (2) the polymerization initiator and (3) the reducing agent.

17 Claims, No Drawings

FLAME-RETARDANT CURABLE RESIN COMPOSITION AND FLAME-RETARDANT CURABLE ADHESIVE COMPOSITION

The present invention relates to a room temperature curable flame-retardant curable resin composition, particularly a flame-retardant curable adhesive composition, which is excellent in low fuming properties and distortion resistance, and which is useful for adhesion of a metal panel or a metal case.

An influence of organic solvents contained in adhesives over environment has been problematic in recent years, and use of an adhesive composition containing no residual volatile matter after curing has been recommended. Particularly, a room temperature quick curable acrylic adhesive composition which undergoes curing at room temperature in a short period of time, is preferred in view of labor saving, resource saving and energy saving. Conventionally, as a room temperature curable adhesive composition, a two-fluid quick curable epoxy adhesive composition, an anaerobic adhesive composition, an instant adhesive composition and a second-generation acrylic adhesive composition (SGA) have been known.

On the other hand, since these adhesive compositions are organic high molecular compounds, when the adhesive portions thereof are heated by a fire, they may undergo heat decomposition or depolymerization of high molecular chains, and they may not function as adhesives.

Accordingly, for applications in which there is a possibility of a fire, such as adhesion for elevator panels of high-rise buildings, addition of a flame retardant has been required in order to suppress burning of an adhesive.

As a method wherein a flame retardant is employed, JP-A-8-283535 discloses a method wherein an adhesive having a flame-retardant filler such as aluminum hydroxide added to an acryl rubber/epoxy resin composite is used as an adhesive for a flexible circuit substrate, and JP-A-8-198907 discloses a method wherein a flame-retardant double-faced tape having antimony trioxide and a flame retardant obtained by brominating an aromatic ring blended is used.

However, in the above methods, the elastic modulus of a cured product of the adhesive tends to be high, and removal of residual stress along with shrinkage on curing may be inadequate, whereby residual distortion is likely to form in the vicinity of the interface between the cured product of the adhesive and an adherend, and the adhesive strength of the adhesive portion tends to decrease. Further, if thin plates (metal panels for e.g. panels for elevators) or films are adhered by the adhesive, the surface is likely to be distorted, thus impairing to appearance.

The present inventors have conducted extensive studies to overcome the above problems, and as a result, have found that a specific flame-retardant curable resin composition is useful for an application in which low fuming properties, distortion resistance and flame retardance are required, such as a metal panel or a metal case, and accomplished the present invention.

Namely, the present invention provides a flame-retardant curable resin composition which comprises (1) a polymerizable vinyl monomer having a glass transition temperature of its homopolymer of at most 0° C., (2) a polymerization initiator, (3) a reducing agent and (4) a flame retardant in an amount of from 25 to 75 parts by mass based on 100 parts by mass of the total of (1) the polymerizable vinyl monomer having a glass transition temperature of its homopolymer of at most 0° C., (2) the polymerization initiator and (3) the reducing agent. Further, the present invention provides the flame-retardant curable resin composition which further comprises (5) a polymerizable vinyl monomer having a glass transition temperature of its homopolymer exceeding 0° C.; the flame-retardant curable resin composition which further comprises (6) an elastomer component; the flame-retardant curable resin composition, wherein (4) the flame retardant is ammonium polyphosphate; the flame-retardant curable resin composition, wherein the cured product has a storage elastic modulus of at most 1,500 MPa at a temperature of 23° C.; and a two-pack type flame-retardant curable resin composition, wherein the components of the flame-retardant curable resin composition are divided into first and second packs, the first pack contains at least (2) the polymerization initiator, and the second pack contains at least (3) the reducing agent.

The present invention still further provides a flame-retardant curable adhesive composition which consists of the above flame-retardant curable resin composition.

Now, the present invention will be described in detail with reference to the preferred embodiments.

The polymerizable vinyl monomer to be used in the present invention is not particularly limited so long as it is radical polymerizable. Among polymerizable vinyl monomers, preferred is a (meth)acrylic acid derivative in view of curing rate, and it is preferred that the polymerizable vinyl monomer is entirely a (meth)acrylic acid derivative.

Here, the polymerizable (meth)acrylic acid derivative is a polymerizable acrylic acid derivative and/or a polymerizable methacrylic acid derivative. They are usually liquid or solid.

As the polymerizable vinyl monomer, a polymerizable vinyl monomer having a glass transition temperature (hereinafter sometimes referred to as Tg) of its homopolymer of at most 0° C. is used in view of distortion resistance.

(1) The polymerizable vinyl monomer having a glass transition temperature of its homopolymer of at most 0° C., such as a polymerizable (meth)acrylic acid derivative having a glass transition temperature of its homopolymer of at most 0° C., may, for example, be phenoxyethyl acrylate (Tg: −22° C.), phenoxydiethylene glycol acrylate (Tg: −25° C.), phenoxytetraethylene glycol acrylate (Tg: −18° C.), methoxyethyl acrylate (Tg: −50° C.), methoxybutyl acrylate (Tg: −56° C.), 2-ethylhexyl methacrylate (Tg: −10° C.), nonylphenyl tetraethylene glycol acrylate (Tg: −20° C.), nonylphenyl tripropylene glycol acrylate (Tg: −3° C.), 2-ethylhexyl tricarbitol acrylate (Tg: −65° C.), isobutyl acrylate (Tg: −24° C.), isooctyl acrylate (Tg: −45° C.), n-lauryl acrylate (Tg: −3° C.), tetrahydrofurfuryl acrylate (Tg: −12° C.), 2-hydroxyethyl acrylate (−15° C.) or 2-hydroxypropyl acrylate (Tg: −7° C.).

Among them, preferred are phenoxytetraethylene glycol acrylate and/or 2-ethylhexyl methacrylate in view of excellent distortion resistance.

The amount of (1) the polymerizable vinyl monomer having a glass transition temperature of its homopolymer of at most 0° C. is preferably from 10 to 40 parts by mass, more preferably from 20 to 30 parts by mass, based on 100 parts by mass of the total of the component (1) and a component (5) to be used as the case requires. If the amount is less than 10 parts by mass, distortion resistance may be small, and if it exceeds 40 parts by mass, the adhesive strength tends to decrease.

As (2) the polymerization initiator to be used in the present invention, preferred is an organic peroxide. The organic peroxide may, for example, be cumene hydroperoxide, p-menthane hydroperoxide, tert-butylhydroperoxide, diisopropylbenzene dihydroperoxide, methyl ethyl ketone peroxide, benzoyl peroxide or tert-butylperoxybenzoate. Among them, preferred is cumene hydroperoxide in view of reactivity.

The amount of (2) the polymerization initiator is preferably from 0.1 to 20 parts by mass, more preferably from 1 to 10 parts by mass, based on the polymerizable vinyl monomer. If it is less than 0.1 parts by mass, the curing rate tends to be low, and if it exceeds 20 parts by mass, storage stability tends to be poor.

(3) The reducing agent to be used in the present invention may be any known reducing agent which reacts with the above polymerization initiator to generate radicals. As representative reducing agents, a tertiary amine, a thiourea derivative and a transition metal salt may, for example, be mentioned.

The tertiary amine may, for example, be triethylamine, tripropylamine, tributylamine or N,N-dimethylparatoluidine. The thiourea derivative may, for example, be 2-mercaptobenzimidazole, methylthiourea, dibutylthiourea, tetramethylthiourea or ethylene thiourea. The transition metal salt may, for example, be cobalt naphthenate, copper naphthenate or vanadyl acetyl acetonate. Among them, preferred are a thiourea derivative and/or a transition metal salt in view of reactivity. Among the thiourea derivatives, preferred is ethylene thiourea in view of reactivity, and among the transition metal salts, preferred is vanadyl acetyl acetonate in view of reactivity.

The amount of (3) the reducing agent is preferably from 0.05 to 15 parts by mass, more preferably from 0.5 to 5 parts by mass, based on 100 parts by mass of the polymerizable vinyl monomer. If it is less than 0.05 parts by mass, the curing rate tends to be low, and if it exceeds 15 parts by mass, the molecular weight of the curable component tends to decrease, and the adhesive strength tends to decrease.

As (4) the flame retardant to be used in the present invention, a conventional flame retardant such as a halogen type flame retardant, a phosphorus type flame retardant, an organic acid metal salt type flame retardant or an inorganic type flame retardant may be mentioned.

The halogen type flame retardant may, for example, be a bromine type flame retardant such as tetrabromobisphenol A, decabromodiphenyloxide, hexabromocyclododecane, octabromodiphenyloxide, bistribromophenoxyethane, tribromophenol, ethylenebistetrabromophthalimide, a tetrabromobisphenol A polycarbonate oligomer, brominated polystyrene, a tetrabromobisphenol A epoxy oligomer/polymer, decabromodiphenylethane, polydibromophenyloxide, hexabromobenzene, tetradecabromodiphenoxyoxybenzene, a brominated epoxy oligomer, bis(tetrabromophthalimide)ethane, bis(tribromophenoxy)ethane, tetrabromophthalic anhydride or tetrabromo-p-cresol, or a chlorine type flame retardant such as chlorinated paraffin or perchlorocyclopentadecane.

The phosphorus type flame retardant may, for example, be a phosphate type flame retardant such as tricresyl phosphate, resorcinyl diphenyl phosphate, hydroquinonyl diphenyl phosphate, phenylnonylphenyl hydroquinonyl phosphate, triphenyl phosphate, phenyldinonylphenyl phosphate, tetraphenyl resorcinol phosphate, tetracresyl-bisphenol A diphosphate or tris(nonylphenyl)phosphate, a halogen-containing phosphate (or phosphonate) type flame retardant such as diphenyl-4-hydroxy-2,3,5,6-tetrabromobenzyl phosphonate, dimethyl-4-hydroxy-3,5-dibromobenzyl phosphonate or diphenyl-4-hydroxy-3,5-dibromobenzyl phosphonate, a polyphosphate such as polyphosphoric acid or ammonium polyphosphate, or red phosphorus.

The organic metal salt type flame retardant may, for example, be an organic metal sulfonate, a metal carboxylate or an aromatic sulfoneimide metal salt.

The inorganic type flame retardant may, for example, be antimony trioxide, aluminum hydroxide, nitrogenated guanidine, antimony pentoxide, magnesium hydroxide, zinc borate, zinc, zinc oxide or a zirconium compound. Among them, preferred is aluminum hydroxide, the release temperature of contained water of crystallization of which is close to the thermal decomposition temperature of the adhesive.

One type of such a flame retardant may be used or at least two types thereof may be used together. Among them, preferred is a phosphorus type flame retardant in view of adhesive properties, distortion resistance and flame retardancy. Among phosphorus type flame retardants, preferred is a polyphosphate in view of adhesive properties, low fuming properties, distortion resistance and flame retardancy, and more preferred is ammonium polyphosphate.

As the ammonium polyphosphate, preferred is one formed into fine particles, and particles having no chemical treatment applied to their surface or particles having their surface subjected to microencapsulation with a heat-curable resin may be used.

The amount of (4) the flame retardant is from 25 to 75 parts by mass, preferably from 30 to 60 parts by mass, based on 100 parts by mass of the curable resin composition which comprises a polymerizable vinyl monomer including the component (1) and the component (5) to be used as the case requires, (2) the polymerization initiator and (3) the reducing agent and (6) an elastomer component to be used as the case requires. If it is less than 25 parts by mass, no adequate flame retardancy may be obtained, and if it exceeds 75 parts by mass, the viscosity tends to increase significantly, whereby coating operation of the adhesive composition tends to be difficult, and the distortion resistance tends to be inadequate.

Further, in the present invention, it is preferred to use (5) a polymerizable vinyl monomer having a glass transition temperature of its homopolymer exceeding 0° C. in order to improve adhesive properties. As (5) the polymerizable vinyl monomer having a glass transition temperature of its homopolymer exceeding 0° C., preferred is a polymerizable (meth)acrylic acid derivative having a glass transition temperature of its homopolymer exceeding 0° C.

(5) The polymerizable vinyl monomer having a glass transition temperature of its homopolymer exceeding 0° C., such as a polymerizable (meth)acrylic acid derivative having a glass transition temperature of its homopolymer exceeding 0° C., may, for example, be methyl methacrylate (Tg: 105° C.), 2-hydroxyethyl methacrylate (Tg: 55° C.), isobornyl methacrylate (Tg: 180° C.), isobornyl acrylate (Tg: 94° C.), methacrylic acid (Tg: 185° C.), ethyl methacrylate (Tg: 65° C.), isobutyl methacrylate (Tg: 48° C.), cyclohexyl methacrylate (Tg: 66° C.), benzyl methacrylate (Tg: 54° C.), 2-hydroxypropyl methacrylate (Tg: 76° C.), glycidyl methacrylate (Tg: 46° C.), tert-butyl methacrylate (Tg: 107° C.), tetrahydrofurfuryl methacrylate (Tg: 60° C.), benzyl methacrylate (Tg: 54° C.), tripropylene glycol diacrylate (Tg: 90° C.), tetraethylene glycol diacrylate (Tg: 50° C.), pentaerythritol triacrylate (Tg: at least 250° C.) or trimethylolpropane triacrylate (Tg: at least 250° C.)

Among them, preferred are methyl methacrylate and/or 2-hydroxyethyl methacrylate in view of excellent curing properties and adhesive properties.

The amount of (5) the polymerizable vinyl monomer having a glass transition temperature of its homopolymer exceeding 0° C., is preferably from 60 to 90 parts by mass, more preferably from 70 to 80 parts by mass, based on 100 parts by mass of the total of the components (1) and (5). If it is less than 60 parts by mass, the adhesive properties tend to be low, and if it exceeds 90 parts by mass, the distortion resistance tends to be small.

Here, the polymerizable vinyl monomer other than the polymerizable (meth)acrylic acid derivative may, for example, be styrene, α-alkylstyrene, divinylbenzene, vinyl ether, divinyl ether, N-vinylpyrrolidone, 2-vinylpyridine or a vinyl ester such as vinyl acetate or vinyl propionate.

Further, in the present invention, (6) an elastomer component may be used in order to improve impact resistance. The elastomer component is a high molecular substance having a rubber-like elasticity at room temperature, and preferred is one capable of being dissolved or dispersed in a polymerizable vinyl monomer.

Such an elastomer component may, for example, be a styrene type thermoplastic elastomer such as an acrylonitrile-butadiene-methacrylic acid copolymer, an acrylonitrile-butadiene-methyl methacrylate copolymer, a butadiene-styrene-methyl methacrylate copolymer (MBS), an acrylonitrile-styrene-butadiene copolymer, a methyl methacrylate-butadiene-acrylonitrile-styrene copolymer (MBAS), or a synthetic rubber such as acrylonitrile-butadiene rubber (NBR), a linear polyurethane, a styrene-butadiene rubber, a chloroprene rubber or a butadiene rubber, or a natural rubber or a styrene-polybutadiene-styrene type synthetic rubber; an olefin type thermoplastic elastomer such as a polyethylene-EPDM synthetic rubber; a urethane type thermoplastic elastomer such as a caprolactone type, an adipate type or a PTMG type; a polyester type thermoplastic elastomer such as a polybutylene terephthalate-polytetramethylene glycol multiblock polymer; a polyamide type thermoplastic elastomer such as a nylon-polyol block copolymer or a nylon-polyester block copolymer; a 1,2-polybutadiene type thermoplastic elastomer; or a polyvinyl chloride type thermoplastic elastomer. One type or at least two types of such elastomer components may be used so long as they have good compatibility with each other.

Among them, preferred are a methyl methacrylate-butadiene-acrylonitrile-styrene copolymer and/or an acrylonitrile-butadiene rubber in view of adhesive properties and solubility to a compound, more preferred is a combination of a methyl methacrylate-butadiene-acrylonitrile-styrene copolymer and an acrylonitrile-butadiene rubber.

The amount of (6) the elastomer component is preferably from 5 to 50 parts by mass, more preferably from 10 to 30 parts by mass, based on 100 parts by mass of the polymerizable vinyl monomer. If it is less than 5 parts by mass, the viscosity and toughness tend to decrease, and if it exceeds 50 parts by mass, the viscosity tends to be too high, thus causing inconvenience in operation.

Further, in the present invention, an acid phosphoric acid compound as represented by the following formula (I) may be used, in order to improve adhesive properties.

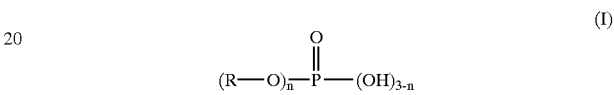
(I)

wherein R is a $CH_2=CR_1CO(OR_2)_m-$ group (wherein $R_1$ is hydrogen or a methyl group, $R_2$ is $-C_2H_4-$, $-C_3H_6-$, $-CH_2CH(CH_3)-$, $-C_4H_8-$, $-C_6H_{12}-$ or

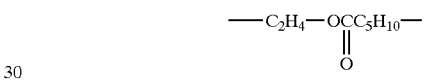

and m is an integer of from 1 to 10), and n is an integer of 1 or 2.

The acid phosphoric acid compound represented by the formula (I) may, for example, be acid phosphoxyethyl (meth)acrylate, acid phosphoxypropyl (meth)acrylate or bis (2-(meth)acryloyloxyethyl)phosphate.

Among them, preferred is (2-hydroxyethyl)methacrylic acid phosphate in view of good adhesive properties.

The amount of the acid phosphoric acid compound represented by the formula (I) is preferably from 0.05 to 10 parts by mass, more preferably from 1 to 7 parts by mass, based on 100 parts by mass of the polymerizable vinyl monomer. If it is less than 0.05 part by mass, no adhesive properties may be obtained, and if it exceeds 10 parts by mass, the adhesive properties tend to be poor.

Further, in the present invention, a paraffin may be used in order that curing of a portion which is in contact with the air is rapidly carried out. The paraffin may, for example, be paraffin, microcrystalline wax, carnauba wax, beeswax, lanolin, spermaceti wax, ceresin or candelilla wax. Among them, preferred is paraffin. The melting point of the paraffin is preferably from 40 to 100° C.

The amount of the paraffin is preferably from 0.1 to 5 parts by mass based on 100 parts by mass of the polymerizable vinyl monomer. If it is less than 0.1 part by mass, curing of a portion which is in contact with the air tends to be poor, and if it exceeds 5 parts by mass, the adhesive strength tends to decrease.

Further, in the present invention, e.g. an antioxidant including a polymerization inhibitor may be used with a purpose of improving storage stability. The antioxidant may, for example, be hydroquinone, hydroquinone monomethyl ether, 2,6-di-tert-butyl-p-cresol, 2,2'-methylenebis(4- methyl-6-tert-butylphenol), triphenyl phosphite, phenothiazine or N-isoproyl-N'-phenyl-p-phenylenediamine. Among them, preferred is p-methoxyphenol.

The amount of the antioxidant is preferably from 0.001 to 3 parts by mass based on 100 parts by mass of the polymerizable vinyl monomer. If it is less than 0.001 part by mass, no effect may be obtained, and if it exceeds 3 parts by mass, the curing strength may decrease.

In the present invention, e.g. fine particle silica may be used to adjust the viscosity or to adjust viscosity and fluidity. Further, a known substance such as a plasticizer, a bulking agent, a coloring agent or an anti-corrosive may be used as the case requires.

Of the flame-retardant curable resin composition of the present invention, the cured product has a storage elastic modulus at a temperature of 23° C. of preferably at most 1,500 MPa, more preferably at most 1,000 MPa. If it exceeds 1,500 MPa, distortion resistance tends to decrease.

As the mode of carrying out the present invention, the curable resin composition of the present invention may be used as a two-pack type flame-retardant curable resin composition. In the two-pack type, not all the essential components of the flame-retardant curable resin composition of the present invention are not mixed during storage, the components of the flame-retardant curable resin composition are divided into a first pack and a second pack, and (2) the polymerization initiator and (3) the reducing agent are separately stored in the first and second packs, respectively. The two-pack type is preferred in view of excellent storage stability. In such a case, the components in both packs are simultaneously or separately coated and contacted for curing to use them as a two-pack type flame-retardant curable resin composition.

The method of adding (4) the flame retardant is not particularly limited, and (i) a method of adding the flame retardant in each of the first and second packs in different amounts, (ii) a method of adding it to only one of the two packs, or (iii) a method of adding it to both packs in the same proportion in an equal amount equally, may, for example, be mentioned. Among these methods, preferred is the method (iii), since the viscosity of the first pack and the viscosity of the second pack are the same, whereby operation can easily be carried out.

The flame-retardant curable resin composition of the present invention may be used as a flame-retardant curable adhesive composition.

The adherend to which the flame-retardant curable adhesive composition of the present invention can be applied for adhesion, is not particularly limited, and examples of which include paper, wood, a ceramic, glass, pottery, a rubber, a plastic and a film thereof, mortar, concrete and a metal. However, excellent adhesive properties may be obtained when the adherend is a metal. The metal may, for example, be iron, stainless steel or brass.

The thickness of the metal plate is preferably from 0.1 to 3.2 mm. If it is less than 0.1 mm, it tends to be difficult to carry out bonding in a state without no distortion due to adhesion, and if it exceeds 3.2 mm, the metal plate tends to be heavy, and weight saving of a metal plate such as an elevator panel may not be achieved.

The metal bonded product obtained by the present invention may be preferably used for an application for which low fuming properties, distortion resistance and flame retardancy are required, such as a metal panel such as a panel for elevators, a panel for inner and external packaging for buildings, or a panel for refrigerators, or a metal case such as an electronic equipment case (such as a patch board) having an electronic equipment mounted thereon.

Further, since the flame-retardant curable adhesive composition of the present invention has small distortion, such an effect can be obtained that when it is used for adhesion of thin plates (such as metal thin plates to be used for a panel for elevators) or films, the distortion on the surface tends to be small, and a favorable appearance can be obtained.

Now, the present invention will be explained in further detail with reference to Examples. However, it should be understood that the present invention is by no means restricted to such specific Examples.

As ammonium polyphosphate, fine particles having their surface coated with a melamine resin were employed, as a paraffin, one having a melting point of 56° C. was used, and as an acid phosphoric acid compound, (2-hydroxyethyl) methacrylic acid phosphate was used.

The unit of each substance used will be represented by parts by mass below. Substances used will be represented by the following symbols.

NBR: Acrylonitrile-butadiene rubber

MBAS: Methyl methacrylate-butadiene-acrylonitrile-styrene copolymer

TCP: Tricresyl phosphate

Various physical properties were measured as follows.

Storage Elastic Modulus

An adhesive composition was formed into a sheet having a thickness of 1 mm and cured, and the storage elastic modulus of the obtained cured product at a temperature of 23° C. was measured by a viscoelasticity measuring apparatus (tension module DMS210 manufactured by Seiko Instruments, Inc.).

Degree of Distortion/distortion

On a center potion of an SPCC test specimen having a length of 200 mm, a width of 25 mm and a thickness of 0.3 mm, an adhesive composition was coated in a size with a length of 100 mm, a width of 25 mm and a thickness of 2 mm, cured and subjected to aging at room temperature for 24 hours, whereupon the warpage (unit: mm) of the SPCC test specimen was measured. Further, after the aging, presence or absence of distortion was visually evaluated at a position distant from the test specimen by 5 m. The evaluation standards are as follows.

○: No warp observed.

Δ: Slight warp observed.

X: Apparent warp observed.

Adhesive Strength Under Tensile Shear

In accordance with JIS K6856, a mixture of first and second packs in an equal amount was coated to one of two test specimens (100 mm×25 mm×1.6 mm thickness, subjected to SECC-D sand blast treatment). Then, immediately after the other test specimen was overlaid on the above test specimen and bonded, the bonded product was subjected to aging at room temperature for 24 hours to obtain a sample.

Here, the adhesive strength under tensile shear (unit: MPa) of the sample was measured at a temperature of 23° C. at a relative humidity of 50% at a tensile rate of 10 mm/min.

Flame Retardancy

A cured product having a thickness of ⅛ inch (6.75 cm) was prepared in accordance with UL-94 vertical firing test method, and flammability was evaluated.

Fuming Properties

On a center portion of an SPCC plate of 150 mm×150 mm×1.6 mm, an adhesive composition was coated in a size of 30 mm×30 mm×2 mm and cured, whereupon fuming properties when burned with a flame from below the SPCC plate were visually evaluated. The evaluation standards are such that ○: no fume emitted, Δ: slight fume emitted, and X: remarkable fume emitted.

EXAMPLE 1

A composition A (for a first pack) and a composition B (for a second pack) as identified in Table 1 were prepared. Here, as monomers, ones having compositions as identified in Table 2 were used. Using the compositions A and B, a two-pack type flame-retardant curable adhesive composition consisting of the first and second packs was prepared, and physical properties were evaluated. The results are shown in Table 3.

TABLE 1

|  | Amount |
| --- | --- |
| Composition A (for a first pack) | |
| NBR | 9.5 |
| MBAS | 6.5 |
| Monomer | 78.0 |
| Cumene hydroperoxide | 5.0 |
| Paraffin | 0.5 |
| p-Methoxyphenol | 0.5 |

TABLE 1-continued

|  | Amount |
| --- | --- |
| Composition B (for a second pack) | |
| NBR | 9.5 |
| MBAS | 6.5 |
| Monomer | 78.0 |
| Ethylene thiourea | 2.2 |
| Paraffin | 0.5 |
| Acid phosphoric acid compound | 3.3 |

Unit of the amount: part(s) by mass

TABLE 2

| Composition of monomer (for a first pack) | A-11 | A-12 |
| --- | --- | --- |
| Methyl methacrylate (Tg = 105° C.) | 50 | 50 |
| 2-Hydroxyethyl methacrylate (Tg = 55° C.) | 25 | 25 |
| Phenoxytetraethylene glycol acrylate (Tg = −18° C.) | — | 25 |
| 2-Ethylhexyl methacrylate (Tg = −10° C.) | 25 | — |

| Composition of monomer (for a second pack) | B-11 | B-12 |
| --- | --- | --- |
| Methyl methacrylate (Tg = 105° C.) | 50 | 50 |
| 2-Hydroxyethyl methacrylate (Tg = 55° C.) | 25 | 25 |
| Phenoxytetraethylene glycol acrylate (Tg = −18° C.) | — | 25 |
| 2-Ethylhexyl methacrylate (Tg = −10° C.) | 25 | — |

Unit of the amount: part(s) by mass
Tg: Glass transition temperature of its homopolymer

TABLE 3

| Test No. | | | 1-1 | 1-2 | 1-3 |
| --- | --- | --- | --- | --- | --- |
| Amount | First pack | Composition A (monomer: A-11) | 100 | — | 100 |
| | | Composition A (monomer: A-12) | — | 100 | — |
| | | Ammonium polyphosphate | 45 | 45 | — |
| | | TCP | — | — | 45 |
| | Second pack | Composition B (monomer: B-11) | 100 | — | 100 |
| | | Composition B (monomer: B-12) | — | 100 | — |
| | | Ammonium polyphosphate | 45 | 45 | — |
| | | TCP | — | — | 45 |
| Storage elastic modulus (MPa) | | | 550 | 600 | 250 |
| Degree of distortion (mm) | | | 0.5 | 1.0 | 0.5< |
| Distortion | | | ○ | ○ | ○ |
| Adhesive strength under tensile shear (MPa) | | | 15 | 7 | 3 |
| Flame retardancy | | | V-0 | V-0 | V-2 |
| Fuming properties | | | ○ | ○ | X |

Unit of the amount: part(s) by mass

EXAMPLE 2

The same operation as in Example 1 was carried out except that a two-pack type flame-retardant curable adhesive composition consisting of first and second packs as identified in Table 4 was prepared, and physical properties were evaluated. The results are shown in Table 4.

TABLE 4

| Test No. | | | 2-1 | 2-2 | 2-3 | 1-1 | 2-4 | 2-5 |
|---|---|---|---|---|---|---|---|---|
| Amount | First pack | Composition A (monomer: A-11) | 100 | 100 | 100 | 100 | 100 | 100 |
| | | Ammonium polyphosphate | — | 25 | 30 | 45 | 60 | 75 |
| | Second pack | Composition B (monomer: B-11) | 100 | 100 | 100 | 100 | 100 | 100 |
| | | Ammonium polyphosphate | — | 25 | 30 | 45 | 60 | 75 |
| Storage elastic modulus (MPa) | | | 330 | 460 | 480 | 550 | 640 | 780 |
| Degree of distortion (mm) | | | <0.5 | <0.5 | <0.5 | 0.5 | 2.5 | 5.5 |
| Distortion | | | ○ | ○ | ○ | ○ | ○ | ○ |
| Adhesive strength under tensile shear (MPa) | | | 13 | 13 | 14 | 15 | 16 | 18 |
| Flame retardancy | | | out | V-2 | V-0 | V-0 | V-0 | V-0 |
| Fuming properties | | | ○ | ○ | ○ | ○ | ○ | ○ |
| | | | Comp. Ex. | Example | Example | Example | Example | Example |

Unit of the amount: part(s) by mass

EXAMPLE 3

The same operation as in Example 1 was carried out except that monomers having compositions as identified in Table 5 were used, compositions A and B were used to prepare a two-pack type flame-retardant curable adhesive composition consisting of first and second packs as identified in Table 6, and physical properties were evaluated. The results are shown in Table 6.

TABLE 5

| Composition of monomer (for a first pack) | A-31 | A-32 | A-33 | A-11 | A-34 | A-35 |
|---|---|---|---|---|---|---|
| Methyl methacrylate (Tg = 105° C.) | 67 | 60 | 27 | 50 | 47 | 40 |
| 2-Hydroxyethyl methacrylate (Tg = 55° C.) | 33 | 30 | 53 | 25 | 23 | 20 |
| 2-Ethylhexyl methacrylate (Tg = −10° C.) | — | 10 | 20 | 25 | 30 | 40 |
| Composition of monomer (for a second pack) | B-31 | B-32 | B-33 | B-11 | B-34 | B-35 |
| Methyl methacrylate (Tg = 105° C.) | 67 | 60 | 27 | 50 | 47 | 40 |
| 2-Hydroxyethyl methacrylate (Tg = 55° C.) | 33 | 30 | 53 | 25 | 23 | 20 |
| 2-Ethylhexyl methacrylate (Tg = −10° C.) | — | 10 | 20 | 25 | 30 | 40 |

Unit of the amount: part(s) by mass
Tg: Glass transition temperature of it homopolymer

TABLE 6

| Test No. | | | 3-1 | 3-2 | 3-3 | 1-4 | 3-4 | 3-5 |
|---|---|---|---|---|---|---|---|---|
| Amount | First pack | Composition A (monomer: A-31) | 100 | — | — | — | — | — |
| | | Composition A (monomer: A-32) | — | 100 | — | — | — | — |
| | | Composition A (monomer: A-33) | — | — | 100 | — | — | — |
| | | Composition A (monomer: A-11) | — | — | — | 100 | — | — |
| | | Composition A (monomer: A-34) | — | — | — | — | 100 | — |
| | | Composition A (monomer: A-35) | — | — | — | — | — | 100 |
| | | Ammonium polyphosphate | 45 | 45 | 45 | 45 | 45 | 45 |
| | Second pack | Composition B (monomer: B-31) | 100 | — | — | — | — | — |
| | | Composition B (monomer: B-32) | — | 100 | — | — | — | — |
| | | Composition B (monomer: B-33) | — | — | 100 | — | — | — |
| | | Composition B (monomer: B-11) | — | — | — | 100 | — | — |
| | | Composition B (monomer: B-34) | — | — | — | — | 100 | — |
| | | Composition B (monomer: B-35) | — | — | — | — | — | 100 |

TABLE 6-continued

| Test No. | 3-1 | 3-2 | 3-3 | 1-4 | 3-4 | 3-5 |
|---|---|---|---|---|---|---|
| Ammonium polyphosphate | 45 | 45 | 45 | 45 | 45 | 45 |
| Storage elastic modulus (MPa) | 2500 | 1500 | 1000 | 550 | 240 | 180 |
| Degree of distortion (mm) | 14.0 | 6.0 | 2.5 | 0.5 | <0.5 | <0.5 |
| Distortion | X | Δ | ○ | ○ | ○ | ○ |
| Adhesive strength under tensile shear (MPa) | 28 | 20 | 18 | 15 | 12 | 8 |
| Flame retardancy | V-0 | V-0 | V-0 | V-0 | V-0 | V-0 |
| Fuming properties | ○ | ○ | ○ | ○ | ○ | ○ |
|  | Comp. Ex. | Example | Example | Example | Example | Example |

Unit of the amount: part(s) by mass

According to the flame-retardant curable resin composition of the present invention, an adhesive composition which has low fuming properties and is excellent in flame retardancy and distortion resistance, can be obtained, and it is preferably used for adhesion of a thin plate (such as a metal thin plate used for a panel for elevators) or a film, or adhesion of a metal panel or a metal case. For example, when it is used as a flame-retardant curable adhesive composition for a panel for elevators, even if the panel for elevators is made thin for a purpose of weight saving of the panel for elevators, no distortion is caused and a good appearance can thereby be obtained, and accordingly the present invention is highly useful industrially.

The entire disclosure of Japanese Patent Application No. 2001-64511 filed on Mar. 8, 2001 including specification, claims and summary are incorporated herein by reference in its entirety.

What is claimed is:

1. A flame-retardant curable resin composition which comprises (1) a polymerizable vinyl monomer having a glass transition temperature of its homopolymer of at most 0° C., (2) a polymerization initiator, (3) a reducing agent and (4) ammonium polyphosphate in an amount of from 25 to 75 parts by mass based on 100 parts by mass of the total of (1) the polymerizable vinyl monomer having a glass transition temperature of its homopolymer of at most 0° C., (2) the polymerization initiator and (3) the reducing agent;

wherein a cured product of said flame-retardant curable resin composition has a storage elastic modulus of at most 1,500 MPa at a temperature of 23° C.

2. The flame-retardant curable resin composition according to claim 1, wherein said polymerizable vinyl monomer is a (meth)acrylic acid derivative.

3. The flame-retardant curable resin composition according to claim 1, wherein said polymerizable vinyl monomer is at least one member selected from the group consisting of phenoxytetraethylene glycol acrylate, 2-ethylhexyl methacrylate and mixtures thereof.

4. The flame-retardant curable resin composition according to claim 1, wherein said polymerization initiator is cumene hydroperoxide.

5. The flame-retardant curable resin composition according to claim 1, wherein an amount of said polymerization initiator is from 0.1 to 20 parts by mass, based on the polymerizable vinyl monomer.

6. The flame-retardant curable resin composition according to claim 1, wherein said reducing agent is a tertiary amine, a thiourea derivative or a transition metal salt.

7. The flame-retardant curable resin composition according to claim 1, wherein an amount of said reducing agent is from 0.05 to 15 parts by mass, based on 100 parts by mass of the polymerizable vinyl monomer.

8. The flame-retardant curable resin composition according to claim 1, wherein an amount of said flame retardant is from 25 to 75 parts by mass, based on 100 parts by mass of the curable resin composition.

9. The flame-retardant curable resin composition according to claim 1, which further comprises (5) a polymerizable vinyl monomer having temperature of its homopolymer exceeding 0° C.

10. The flame-retardant curable resin composition according to claim 9, wherein an amount of said polymerizable vinyl monomer having a glass transition temperature of its homopolymer of at most 0° C. is from 10 to 40 parts by mass, based on 100 parts by mass of the total of the component (1) and component (5).

11. The flame-retardant curable resin composition according to claim 9, wherein said polymerizable vinyl monomer having a glass transition temperature of its homopolymer exceeding 0° C. is at least one member selected from the group consisting of methyl methacrylate, 2-hydroxyethyl methacrylate and mixtures thereof.

12. The flame-retardant curable resin composition according to claim 9, wherein an amount of said polymerizable vinyl monomer (5) having a glass transition temperature of its homopolymer exceeding 0° C., is from 60 to 90 parts by mass, based on 100 parts by mass of the total of the components (1) and (5).

13. The flame-retardant curable resin composition according to claim 1, which further comprises (6) an elastomer component.

14. The flame-retardant curable resin composition according to claim 13, wherein said elastomer component (6) is at least one member selected from the group consisting of i) a methyl methacrylate-butadiene-acrylonitrile-styrene copolymer, ii) an acrylonitrile-butadiene rubber and iii) a combination of a methyl methacrylate-betadiene-acrylonitrile-styrene copolymer and an acrylonitrile-butadiene rubber.

15. The flame-retardant curable resin composition according to claim 13, wherein an amount of said elastomer component (6) is from 5 to 50 parts by mass, based on 100 parts by mass of the polymerizable vinyl monomer.

16. A two-pack type flame-retardant curable resin composition, wherein the components of the flame-retardant curable resin composition as defined in claim 1 are divided into first and second packs, the first pack contains at least (2) the polymerization initiator, and the second pack contains at least (3) the reducing agent.

17. A flame-retardant curable adhesive composition which consists of the flame-retardant curable resin composition as defined in claim 1.

* * * * *